Figure 1:
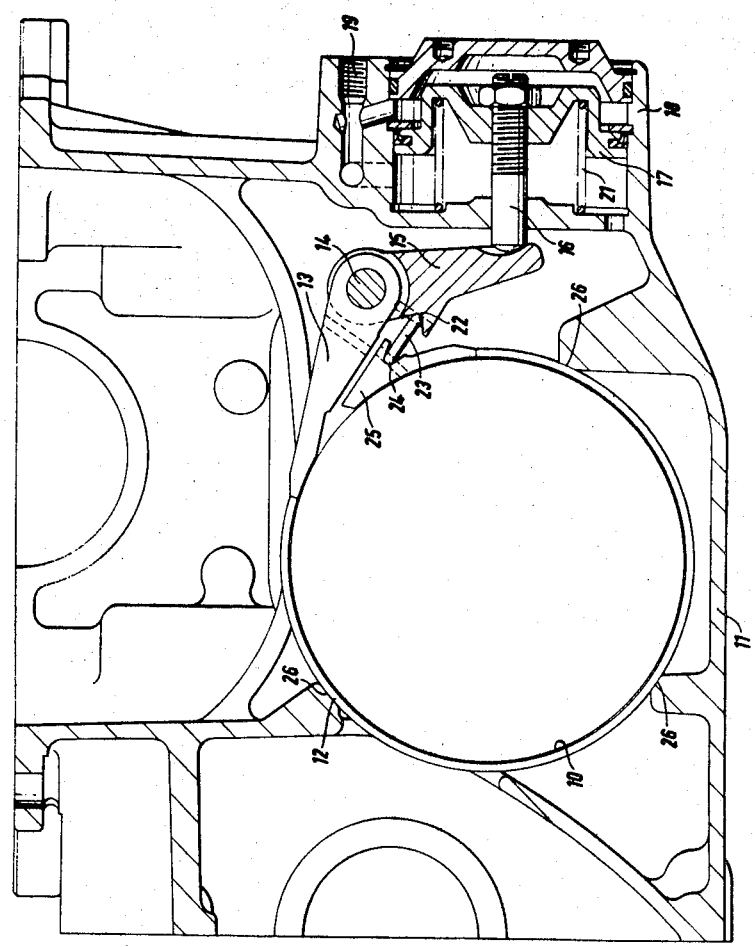

United States Patent

[11] 3,557,911

| [72] | Inventor | Keith Ellard |
| | | Warwickshire, England |
| [21] | Appl. No. | 778,067 |
| [22] | Filed | Nov. 22, 1968 |
| [45] | Patented | Jan. 26, 1971 |
| [73] | Assignee | Automotive Products Company, Limited |
| | | Leamington Spa, Warwickshire, England |
| [32] | Priority | Nov. 23, 1967 |
| [33] | | Great Britain |
| [31] | | 53303/67 |

[54] BAND BRAKES
2 Claims, 2 Drawing Figs.

[52] U.S. Cl. ............................................. 188/77, 192/80
[51] Int. Cl. ............................................. F16d 49/12
[50] Field of Search ............................................. 188/77; 192/80

[56] References Cited
UNITED STATES PATENTS

| 402,257 | 4/1889 | Leavitt, Jr. | 188/77 |
| 1,823,589 | 9/1931 | Christensen | 188/77X |
| 2,875,858 | 3/1959 | Dunham | 188/77 |
| 3,103,991 | 9/1963 | Flinn | 188/77 |
| 3,290,871 | 12/1966 | Haas | 188/77X |

*Primary Examiner*—George E. A. Halvosa
*Attorney*—Lawrence J. Winter

ABSTRACT: In a band brake comprising a brake band having a fixed anchorage at one end and brake actuating means acting on the other end the actuating means acts on the band through means exerting a reaction, corresponding to the applying load, on the fixed anchorage, which reaction acts in opposition to the torque load applied to the anchorage by the brake band so as to reduce the resultant load on the anchorage.

PATENTED JAN 26 1971

3,557,911

INVENTOR
Keith Ellard
BY Lawrence J Winter
ATTORNEY

BAND BRAKES

The present invention relates to band brakes.

In band brakes as now constructed, due to the manner in which the band actuating means is arranged in relation to the fixed anchorage for the band, all the torque load created during a braking operation is absorbed by the fixed anchorage. Such an arrangement has obvious disadvantages and therefore it is an object of the present invention to provide improvements by means of which the load on the fixed anchorage of the band of a band brake can be reduced.

According to the present invention, in a band brake comprising a brake band having a fixed anchorage at one end and acted on at the other end by brake actuating means to apply the band to a drum, means interposed between the said other end of the brake band and the actuating means exert a reaction on the fixed anchorage of the brake band corresponding to the applying load on the brake band and acting in opposition to the torque load applied to the anchorage by the brake band, so that the resultant load on the said anchorage is less than the torque load.

The said interposed means may comprise an arm pivotally mounted so as to be swingable about an axis about which the anchored end of the brake band is also pivotally movable, and a thrust member mounted between the said arm and the said other end of the brake band, the actuating means moving the said arm about its pivotal mounting to cause the thrust member to apply the brake band to the drum and the direction in which the load is applied by the thrust member being at an angle to the direction in which the torque load acts on the fixed anchorage.

Band brakes according to the present invention can be operated mechanically, electrically or by fluid pressure. There will now be described, by way of example, one form of fluid pressure operated band brake embodying the invention.

Figure 2:
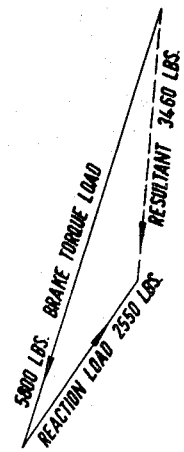

In the accompanying drawing, which will be referred to in the description of the band brake:

FIG. 1 is a view in elevation, with some parts in section, of the band brake; and FIG. 2 is a diagram of forces illustrating the effect of the invention.

Referring to FIG. 1 of the drawing, a drum 10 which may, for example, be mounted on an element of a gear train in a variable speed transmission mechanism which requires to be held against rotation to provide a reaction member for the gear train, is housed in a casing 11. A brake band 12 extending around the circumference of the drum 10 is fixed at one end to an end member 13 pivotally mounted on an anchor pin 14 extending parallel to the drum axis and rigidly mounted in the casing 11. The anchor pin 14 is spaced radially away from the periphery of the drum 10.

An arm 15, also pivotally mounted at one end on the anchor pin 14 is engaged at its opposite end by a push rod 16 carried by the piston 17 of a fluid pressure motor cylinder 18 mounted in the casing 11, and serving as the brake actuating means. The motor cylinder 18 is mounted with its axis parallel to but offset from a diameter of the drum 10. The said motor cylinder is provided with an inlet port 19 for connection to a source of fluid pressure, and a coiled compression spring 21 is provided to retract the piston 17.

Intermediate its ends, the arm 15 is formed on one side thereof, with a notch 22 in which is engaged one end of a thrust member 23 the other end of which is engaged in a similar notch 24 in a second end member 25 fixed to the end of the brake band 12 remote from its anchored end, the arrangement being such that the thrust member lies on a line which is tangent to the periphery of the brake drum at a point between the ends of the brake band and is inclined to both the axes of the motor cylinder and the line of action of the torque load on the anchor pin, which line of action is substantially tangent to the circumference of the brake drum 10 and passing through the anchor pin.

The admission of fluid under pressure to the motor cylinder 18 moves the piston 17 and push rod 16 outwardly, the thrust of the push rod 16 swinging the arm 15 about the anchor pin 14 towards the drum 10. The swinging movement of the arm 15 is transmitted through the thrust member 23 to the end of the brake band 12 remote from its anchored end, to urge the said brake band 12 against the drum 10, and it will be apparent that a reaction force, acting outwardly from the drum will be applied by the arm 15 to the anchor pin 14.

In a practical example of a band brake according to the invention, assuming that the fluid pressure admitted to the motor cylinder 18 has a pressure of 150 p.s.i. the load in the thrust member 23 is of the order of 2,550 pounds which load appears at the anchor pin 14 as the resultant couple. The drag load on the anchor pin 14 due to absorption of torque is also taken by the anchor pin and is of the order of 5,800 pounds. Considering the line of action of these two forces and their magnitude a force diagram about the anchor pin can be drawn as in FIG. 2 the resultant of the applied forces being approximately 3,460 pounds. Thus a portion of the torque absorption load of 5,800 pounds is offset so that the anchor pin is subject to the smaller load of 3,460 pounds.

Conveniently, the end member 13 is bifurcated at its end which engages the anchor pin 14, the arm 15 being fitted between the furcations. The thrust member 23 is conveniently in the form of a flat strut with rounded edges to engage in the rounded ends of the notches in the arm 15 and the end member 25. The brake band is preferably resilient, so that it expands when the fluid pressure is relieved and is thus moved away from the drum 10, abutments 26 being provided in the casing to support it substantially concentrically with the drum.

I claim:

1. A band brake comprising a drum, a brake band disposed around said drum to engage and grip said drum, fixed anchor pin means disposed adjacent one side of said drum, end member means fixedly secured to said pin means and connected to one end of said brake band, brake actuating means operatively connected to the opposite end of brake band for applying said brake band to said drum, lever means having one end pivotally mounted on said pin means, push rod means disposed between the opposite end of said lever means and said brake actuating means to apply thrust exerted by said brake actuating means to said opposite end of said lever means to cause it to rotate about said pin means, and thrust means disposed between said lever means and said opposite end of said brake band, said thrust means engaging said lever means intermediate its ends and disposed on the side thereof facing said opposite brake band end and disposed away from the side of said lever means upon which said push rod means is disposed.

2. A band brake according to claim 1 wherein said thrust means is a strut having rounded edges engaged in notches in said lever means and in an end member fixed to the said opposite end of said brake band remote from its anchored end.